United States Patent
Baucke et al.

(10) Patent No.: US 10,487,018 B2
(45) Date of Patent: Nov. 26, 2019

(54) METHOD FOR THE PRODUCTION OF SULPHATE OF POTASH GRANULATES, SULPHATE OF POTASH GRANULATE OBTAINED THEREBY, AND USE THEREOF

(71) Applicant: K+S Kali GmbH, Kassel (DE)

(72) Inventors: Guido Baucke, Schenklengsfeld OT Wippershain (DE); Marcel Mueller-Goldkuhle, Essen (DE); Armin Dietrich, Weissenborn (DE); Torsten Rest, Heringen (DE); Roland Keidel, Petersberg-Steinau (DE); Ludger Waldmann, Telgte (DE)

(73) Assignee: K+S Kali GmbH, Kassel (DE)

( * ) Notice: Subject to any disclaimer, the term of this patent is extended or adjusted under 35 U.S.C. 154(b) by 159 days.

(21) Appl. No.: 15/515,436

(22) PCT Filed: Sep. 30, 2015

(86) PCT No.: PCT/DE2015/000476
§ 371 (c)(1),
(2) Date: Mar. 29, 2017

(87) PCT Pub. No.: WO2016/050232
PCT Pub. Date: Apr. 7, 2016

(65) Prior Publication Data
US 2017/0217849 A1 Aug. 3, 2017

(30) Foreign Application Priority Data
Sep. 30, 2014 (DE) .................. 10 2014 014 099

(51) Int. Cl.
| | |
|---|---|
| C05D 1/02 | (2006.01) |
| C05G 3/00 | (2006.01) |
| C01D 5/00 | (2006.01) |
| C05D 1/00 | (2006.01) |
| B01J 2/22 | (2006.01) |
| C01D 3/04 | (2006.01) |

(52) U.S. Cl.
CPC .............. C05G 3/0088 (2013.01); B01J 2/22 (2013.01); C01D 3/04 (2013.01); C01D 5/002 (2013.01); C01D 5/004 (2013.01); C05D 1/005 (2013.01); C05D 1/02 (2013.01); C05G 3/0058 (2013.01); C01P 2004/61 (2013.01); C01P 2006/11 (2013.01)

(58) Field of Classification Search
CPC ........ C01D 5/002; C05G 3/0058; C05D 1/02; C05D 5/004; C05D 1/005
See application file for complete search history.

(56) References Cited

U.S. PATENT DOCUMENTS

| | | | | |
|---|---|---|---|---|
| 5,431,708 | A | * 7/1995 | Lehmann | ................ B65G 3/02 71/28 |
| 2003/0135957 | A1 | 7/2003 | Phinney | |
| 2014/0245803 | A1* | 9/2014 | Forsythe | .............. C05G 3/0058 71/61 |

FOREIGN PATENT DOCUMENTS

| | | | |
|---|---|---|---|
| CN | 1 039 012 A | 1/1990 | |
| DE | 1242249 | * 10/1917 | ............. B65G 69/00 |
| DE | 28 10 640 A1 | 9/1979 | |
| DE | 28 10 640 C2 | 9/1979 | |
| EP | 0 488 199 A1 | 6/1992 | |
| EP | 0488199 | * 1/1995 | ............. C01B 25/30 |
| EP | 1 219 581 A2 | 7/2002 | |
| WO | WO 2007/071175 A1 | 6/2007 | |

OTHER PUBLICATIONS

Binmaster Resources. Bulk Material, Bulk Density <https://www.binmaster.com/_resources/dyn/files/75343622z9caf67af/_fn/Bulk%20Density.pdf> pp. 1-15. obtained Nov. 29, 2018.*
K-Mag Granular. Product Portfolio. MSDS pp. 1-9 <http://www.kmag.com/k-mag-granular> Dec. 29, 2013.*
International Search Report dated Jun. 29, 2016, in PCT/DE2015/000476 filed Sep. 30, 2015.
Winnacker, Küchler, Wiley VCH Verlag, vol. 8, 2005, Total 3 Pages.
A. Hollstein, et al., "Die Granulierung von Kaliumsulfat", vol. 7, Issue 12, 1979, pp. 498-500.

* cited by examiner

*Primary Examiner* — Jennifer A Smith
(74) *Attorney, Agent, or Firm* — Oblon, McClelland, Maier & Neustadt, L.L.P.

(57) ABSTRACT

The invention relates to a method for producing sulphate of potash granulates, wherein 0.1 to 7.5 wt % of a sodium salt selected from among sodium chloride, sodium sulphate, sodium sulphate hydrates, sodium hydroxide and mixtures thereof are added to the sulphate of potash during the granulation process, the percentage by weight being in relation to the sulphate of potash used. In addition, 0.1 to 2.5 wt % of water are added prior to or during the granulation process. The invention also relates to the granulates obtained by said method as well as the use of sodium salts and glaserite and mixtures thereof for improving the mechanical properties of sulfate of potash granulates. The sulphate of potash granulates produced by the method of the invention have significantly greater bursting strength and significantly greater abrasion resistance than granulates known from the prior art.

14 Claims, No Drawings

METHOD FOR THE PRODUCTION OF SULPHATE OF POTASH GRANULATES, SULPHATE OF POTASH GRANULATE OBTAINED THEREBY, AND USE THEREOF

The present invention relates to a process for the production of potassium sulphate granulates and the potassium sulphate granulate obtained thereof as well as its use.

Potassium sulphate also referred to as SOP (sulphate of potash) rarely occurs in nature in its pure form (as arcanite). Potassium sulphate is however contained in the form of so-called double salts in various minerals, such as schoenite, leonite, langbeinite, polyhalite and glaserite. Industrially, potassium sulphate can be manufactured using the Mannheim process, for example, or from potassium chloride and kieserite, see also Winnacker, Küchler, WILEY VCH Verlag, Vol. 8, 2005, p. 91f. In agriculture, potassium sulphate is used as a component of so-called potash fertilisers. Potassium sulphate combines the essential nutrients of potassium and sulphate in a single optimal form, with good water solubility and is therefore quickly available to plants after application in the form of fertiliser allowing them to absorb it directly.

Mineral fertilisers are often used in granulate form, as this form demonstrates favourable handling properties. For instance, granulates tend to produce much less dust, have a longer shelf-life, are hygroscopically more stable and can be dosed and applied through spreading more easily than the respective fine, powder-based mineral fertilisers. In addition, granulates are much less prone to being lost through wind, once they have been applied in open areas.

Granulation refers to the agglomeration of powder or fine particles to larger particle units, so-called granulates. In particular, this refers to the use of processes such as pressure and structural agglomeration as well as related processes, in which dispersed, solid primary particles are agglomerated by way of grain enlargement. Granulation is frequently used in the presence of binding agents. These relate to liquid or solid materials, whose adhesive forces generate cohesion between the particles. The use of such binding agents is necessary in case particle granulation without the use of binding agents does not lead to a sufficiently stable granulate. Known binding agents include e.g. water, gelatine, starch, lignosulfonate, calcium hydroxide and molasses. The selection of binding agent can significantly affect the properties of the agglomerate, in particular its mechanical strength (e.g. abrasion, break or crack-resistance), hygroscopic stability and dust-forming tendency.

Granulation can, for example, be performed using a roller press. During this type of pressure agglomeration, also known as pressure granulation, the powder or fine particles are compressed and compacted between two counter-rotating rollers, tensioned within a frame structure. Frequently one of the rollers remains in a fixed position, whilst the other is loose. This loose roller is generally controlled by a hydraulic pressing device such that, during the pressing process, the amount of applied force can be set precisely. The total force of pressure applied in this manner, is frequently set proportional to the working length of the roller and given as the specific pressure or line load, e.g. in N/cm.

The dosing unit, used to convey the materials into the roller slit for compaction, include gravity or screw feeders.

The materials subject to compaction are pressed into slugs. To produce granules of a given grain size, the compaction process is followed by grinding of the slugs using grinders. During subsequent classification, fine and oversize particles are separated allowing the desired grain size spectrum to be produced.

Processes for potassium sulphate powder/fine particle granulation are known from the prior art.

DE 2810640 C2 describes a granulation process, in which the temperature of a finely grained material containing potassium or ammonium salts is heated to between 40° C. and 50° C. before pressing and after which the material is pressed. The mechanical strength achieved through this granulation process can be improved further.

WO 2007/071175 describes a process for production of granulated potassium sulphate using corn starch as a binding agent.

A process and experimental set-up for granulation of potassium sulphate is known from "Die Granulierung von Kaliumsulfat", A. Hollstein, Kali and Steinsalz, Vol. 7 (1979) Issue12. The addition of water and/or steam before the pressing slit is known. The manufactured products, however, demonstrate potential for improved strength properties.

To reduce the formation of dust via abrasion, the use of materials containing mineral oil, vegetable oil, glycerine or polyethylene glycol is recommended in the prior art.

A process for the granulation of potassium sulphate forms the basis of the purpose of the invention. The granulates produced using this process should possess improved mechanical stability and in particular demonstrate higher crack-resistance and reduced abrasion.

SUMMARY OF THE INVENTION

Surprisingly it was discovered that the task in question could be solved through granulation of a mixture consisting mostly of fine potassium sulphate and at least one sodium salt with the addition of water, whereby the sodium salt is selected from sodium chloride, sodium hydroxide, sodium sulphate (and its hydrates) and mixtures thereof—in a quantity of 0.1 wt % to 7.5 wt %, preferentially 1.8% to 4.0%, in particular preferentially 2.5% to 3.5%, calculated as weight fraction of the used sodium salt with respect to the used sodium sulphate.

In place of the abovementioned sodium salts, other salts containing sodium can be used, e.g. dansite ($Na_{21}Mg[(Cl_3(SO_4)_{10}]$, loewit ($Na_{12}Mg_7(SO_4)_{13} \times 15H_2O$), glauberite ($CaNa_2(SO_4)_2$), astrakanite ($Na_2Mg(SO_4)_2 \times 2H_2O$) and/or rinnetite ($K_3Na(FeCl_6)$).

The process of the invention produces potassium sulphate granules, which amongst other things harden quicker than granules produced using conventional processes, i.e. the curing period of the granulate is reduced. The granulates produced in this way demonstrate constant particle size distributions and densities, possess the required good strength properties, in particular good mechanical stability such as break-resistance and/or reduced abrasion and in most cases can be handled and mixed without being damaged.

Therefore a process for production of potassium sulphate granulates, including the granulation of fine potassium sulphate, characterised by the fact that, before granulation, a sodium salt selected from amongst sodium chloride, sodium hydroxide, sodium sulphate and its hydrates and mixtures thereof is added to the fine potassium sulphate in quantities of 0.1 wt % to 7.5 wt % with respect to the used potassium sulphate, forms the object of the invention.

Another object of the invention consists of potassium sulphate granulates, in particular with a sodium content lying in the range of 0.5% to 1.4%, produced using the process of the invention.

Another object of the invention consists of the use of sodium salts selected from amongst sodium chloride, sodium hydroxide, sodium sulphate and its hydrates and mixtures thereof, to improve the mechanical properties of potassium sulphate granulates, in particular to increase the strength and/or increase abrasion-resistance.

DESCRIPTION OF THE INVENTION

The invention covers the addition of sodium salts as well as water during the granulation process. This can be achieved by mixing the sodium salt with the potassium sulphate being granulated and subsequently or at the same time wetting it with water and/or water vapour. In place of water, an aqueous solution of sodium salt may be used.

The addition of this additive to potassium sulphate can be performed in a mixer, located upstream from the press, or in a conveyance device and/or additive chute or feeder unit of the roller press.

In one form of implementation, the sodium salt is added as a solid.

In another form of implementation, a portion of the sodium salt is added as an aqueous solution and another portion in powder form.

In another form of implementation, the sodium salt is added as an aqueous solution. Other experiments were performed with thenardite ($Na_2SO_4$), mirabilite ($Na_2SO_4 \times 10\ H_2O$) and sodium hydroxide (NaOH in a 50% aqueous solution).

Within the scope of the present invention, the term post-processing refers to the addition of water or an aqueous solution to the granulate after the classification process.

Granulation within the process of the invention can be performed analogously to the agglomeration processes known from the prior art, e.g. pressure or structural agglomeration, as described for example in Wolfgang Pietsch, Agglomeration Processes, Wiley-VCH, 1$^{st}$ Edition, 2002, and in G. Heinze, Handbuch der Agglomerationstechnik, Wiley-VCH, 2000.

It is preferred within the scope of the invention to perform granulation using pressure agglomeration.

During pressure agglomeration, granulation is performed by pressing the potassium sulphate and salt mixture containing sodium salt in the presence of water and/or water vapour. The sodium salt can be added as a solid and/or in the form of an aqueous solution.

The addition of sodium solution should be performed as shortly as possible before the pressing process and the sodium salt should be as homogeneously distributed as possible upon pressing or during structural agglomeration.

The particle sizes given here and in the following can be determined using sieve analysis for sizes >150 μm and, in case of smaller particles, using laser diffraction methods.

In one preferred form of implementation of the invention, the sodium salt is added in the form of a dust with a maximum particle size of 200 μm or in the form of an aqueous solution.

In another preferred for of implementation of the invention, a portion of the sodium salt is added in the form of a dust with a maximum particle size of 200 μm and the rest of the sodium salt is added in the form of an aqueous solution.

In one preferred form of implementation of the invention, the potassium sulphate used for granulation consists of at least 90 wt % particles with a diameter of less than 2.0 mm and in particular 1.0 mm. It is preferred that at least 90 wt % of the potassium sulphate possesses a particle size lying in the range of 0.01 mm to 2.0 mm and preferentially 0.02 mm to 1.0 mm. The $d_{50}$ value (weighted average of particle size) of the potassium sulphate particles used for granulation generally lies in the range of 0.05 mm to 1.1 mm and in particular in the range of 0.1 mm to 0.7 mm.

In general, at least 90 wt % of the particulate sodium salt in the form of a dust demonstrates a particle size of less than 0.2 mm, in particular less than 0.1 mm. It is preferred that the size of the particles of at least 90 wt % of the particulate sodium salt lies in the range of 0.01 mm to 0.2 mm, preferentially 0.02 mm to 0.1 mm. The $d_{50}$ value (weighted average of particle size) of the sodium slat particles used for granulation generally lies in the range of 0.01 mm to 0.2 mm. The sodium salt, e.g. NaCl, can also be used as a solid with larger particle sizes; the particle size just has to be selected such that a constant distribution is ensured throughout the granulate.

In one form of implementation of the invention, the sodium salt in the form of a dust demonstrates a bulk density lying in the range of 250 kg/m$^3$ to 1300 kg/m$^3$.

All salts containing Na can be used as sodium salts, e.g. sodium chloride, sodium hydroxide, sodium sulphate (and its hydrates, e.g. mirabilite ($Na_2SO_4 \times 10\ H_2O$)) and mixtures thereof, in a quantity of 0.1 wt % to 7.5 wt %, preferentially 1.8% to 4.0%, in particular 2.5% to 3.5%, calculated as mass fractions of the used sodium salts with respect to the used potassium sulphate. In place of the abovementioned sodium salts, other salts containing Na, e.g. dansite ($Na_{21}Mg[(Cl_3(SO4)_{10}]$), loewite ($Na_{12}Mg_7(SO4)i_3 \times 15H_2O$), glauberite ($CaNa_2(SO_4)_2$), astrakanite ($Na_2Mg(SO_4)_2 \times 2H_2O$), rinneite ($K_3Na(FeCl_6)$) can be used.

In one particularly preferred form of implementation of the invention, the sodium salt is sodium chloride.

Insofar as the sodium salt contains sodium chloride, it is preferred that the sodium chloride particles also demonstrate particle sizes within the range stated for the sodium salt.

In one of the preferred forms of implementation of the invention, the quantity of water added before or during the pressing process lies in the range of 0.1 wt % to 2.5 wt %, preferentially in the range of 0.1 wt % to 1.5 wt %, of particular preference in the range of 0.3 wt % to 1.2 wt % and/or after the pressing process in the range of 0.1 wt % to 2.5 wt %, preferentially in the range of 0.1 wt % to 1.5 wt %, of particular preference in the range of 0.1 wt % to 1.2 wt %. The total quantity of added water totals a maximum of 3.5 wt % with respect to the anhydrous potassium sulphate.

The addition of water after the pressing process is optional.

Within the scope of the invention, the specific line load refers to a force per unit length. The line load acts along an imaginary line running along the width of the press roller. The specific line load was determined for press roller diameters of 1000 mm and an average slug thickness of 10 mm.

In one preferred form of implementation of the invention, pressure agglomeration covers compaction of the mixture of potassium sulphate, sodium salt and water using a roller press with a specific line load lying in the range of 30 kN/cm to 100 kN/cm, preferentially in the range of 40 kN/cm to 80 kN/cm, of particular preference in the range of 45 kN/cm to 75 kN/cm, with respect to 1000 mm roller diameter and an average slug thickness of 10 mm.

In one preferred form of implementation of the invention, pressure agglomeration for compaction of the mixture of potassium sulphate, sodium salt and water is performed using a roller press and covers subsequent grinding and classification of the slugs obtained via compaction.

In another form of the implementation of the invention, the slugs are moistened with water after the pressing process, in particular after and/or during grinding and/or classification. It is preferred that the quantity of water added the press process lies in the range of 0.1 wt % to 2.5 wt %, preferentially in the range of 0.1 wt % to 1.5 wt %, of particular preference in the range of 0.3 wt % to 1.2 wt %. The entire quantity of added water totals a maximum of 3.5 wt %, with respect to the anhydrous potassium sulphate.

Water can also be added during post-processing of a pre-existing granulate, e.g. on a conveyor used for curing or in a mixer.

Within the scope of the present invention, the total quantity of water can be added simultaneously during granulation, or the addition of water can be performed in portions, during and/or after the pressing process. Within the scope of the present invention, the phrase "after the pressing process" relates to the addition of water, for example, via spraying the produced and/or ground slugs and/or the sieved granulate. The phrase "before and/or during the pressing process" refers to one or more of the abovementioned points of addition (upstream mixer, conveyance device and/or additive chute or feeder unit of the roller press) within the process of the invention located before the final step that leads to a granulate.

In one of the preferred forms of implementation of the invention, granulation is performed at a temperature of between 20° C. to 100° C.

In addition, the potassium sulphate and/or sodium salts used for granulation may contain small amounts of other fertiliser components such as ammonium sulphate, ammonium nitrate, urea, DAP (diammonium phosphate, $(NH_4)_2HPO_4$), kieserite or micronutrients. The fraction of other components generally does not exceed 10 wt % with respect to the total weight of the salt mixture. Examples of micronutrients include in particular slats containing boron, zinc and manganese. The fraction of these micronutrients generally does not exceed 5 wt %, in particular 1 wt % with respect to the total weight of the salt mixture.

The granulates produced with the process of the invention are characterised by high mechanical stability, reduced dust formation rates and good hygroscopic stability.

The details, stated in connection with the process of the invention, regarding the preferred forms of implementation also relate to the granulate of the invention and its use, e.g. as fertiliser.

EXAMPLES

The process of the invention, the potassium sulphate used by the invention and the purpose of the invention are explained in more detail by way of the following examples. The following Table 2 presents a summary of the experiments performed as Examples 1 to 9 subject to type and quantity of the components used. Potassium sulphate appears under Materials as SOP (sulphate of potash) subject to the respective specification. Two SOP fine products from the company K+S Kali GmbH were used as potassium sulphate powder, which demonstrated differing specifications:

SOP fine product 1:
Potassium sulphate ($K_2SO_4$): 95.5 wt %
Other sulphates ($MgSO_4$, $CaSO_4$): 2.6 wt %
Other components, primarily crystallisation water: 0.9 wt %
Humidity: 0.2 wt % Grain size distribution: >0.85 mm 1 wt %; 0.5-0.85 mm 3%; 0.25-0.5 mm 12%; 0.15-0.25 mm 22%; 0.09-0.15 mm 29%; <0.09 mm 33%;
SGN: 12 (size-guide number)
SOP fine product 2:
Potassium sulphate ($K_2SO_4$): 93 wt %
Other sulphates ($MgSO_4$, $CaSO_4$): 4.1 wt %
Other components, primarily crystallisation water: 1.0 wt %
Humidity: 0.2 wt %
Grain size distribution: >0.85 mm 2 wt %; 0.5-0.85 mm 3%; 0.25-0.5 mm 12%; 0.15-0.25 mm 25%; 0.09-0.15 mm 31%; <0.09 mm 27%;
SGN: 13

Calculations show that there is a maximum water fraction in the obtained granulate of about 2.0 wt %. To determine the annealing loss, the substance is covered with lead oxide, heated in a muffle furnace to between 450° C. and 600° C. before the weight difference is measured gravimetrically.

Drying loss (at 105° C.) was measured by determining the residue and the water content according to DIN EN 12880.

To perform pressure agglomeration using roller compaction as in Examples 1 to 9, the potassium sulphate (SOP fine products) and the sodium salt, where appropriate, was fed into the compaction zone between the rollers and the powder/fine particles were then pressed into slugs between the counter-rotating rollers using a given force. Grinding and classification of the slugs obtained via compaction were then performed.

The roller press possesses the following properties and set parameters:
Feeder mechanism: screw feeder
Roller diameter: 800 mm
Operating width of the press rollers: 180 mm
Operating power of the press rollers: up to 160 kW
Specific line load between the rollers: up to 100 kN/cm
Roller rim speed: 0.13 m/s to 0.84 m/s
Roller material/roller cover: segments with waffle-like structure The grinding unit was an impact mill from the Hazemag company with a rotor diameter of 460 mm and was fitted with 2 impact bars with a bar width of 340 mm as well as 2 impact plates.

Two vibrating sieve machines from the Rhewum company were used as classification units.

The sieving process produced the following grain band distribution of the granulate of the invention as presented, for example, by Table 1.

TABLE 1

Grain band distribution of the produced potassium sulphate granulate

| Grain class | Residual amount/wt % |
|---|---|
| >5.0 mm | 0 |
| >4.0 mm | 0.4 |
| >3.15 mm | 32.6 |
| >2.5 mm | 81.5 |
| >2.0 mm | 96.7 |
| >0 mm | 100 |

According to X-ray powder diffractometry, the main component of the product is an "arcanite ($K_2SO_4$) phase". Minor components are an aphthitalite phase (potassiumsodium-sulphate, $K_3Na(SO_4)_2$, also known as glaserite). It is suspected that the formation of the glaserite phase at the edges of the grains leads to improved and more permanent binding of the pressed particles of the potassium sulphate and therefore causes less, or helps to reduce, abrasion and leads to higher crack-resistance. The use of glaserite as a binding agent in potassium sulphate granulates, in particular to improve the mechanical properties of the granulate, is therefore an object of the invention.

As glaserite formation as a recrystallisation is also possible at room temperature, improvement to the crack-resistance and abrasion values can also be expected during structural granulation e.g. on a granulation dish, so long as sodium salts are present, either as solid or liquid, and homogeneously distributed with water/water vapour. In the case of structural granulation, e.g. in the fluidised bed coating, these can also be performed at higher temperatures mentioned above.

Table 2 presents the results for abrasion and crack-resistance. The admixture with the SOP fine products are included "Additives".

During production of the granulates, breaking strength, abrasion and residual humidity are determined using the following methods: the average breaking strengths were determined using the tablet breaking strength tester model TBH 425D from the ERWEKA company on the basis of measurements on 56 individual agglomerates with particle sizes between 2.5 mm to 3.15 mm.

The values for abrasion were determined using the rolling drum process according to Busch. The abrasion compressive strength values were measured on granulates with fractions between 2.5 mm to 3.15 mm.

The residual moisture was determined using the halogen dryer model HR 73 from the Mettler company.

The measured values were determined directly after the experiment as well as after a maturity period, i.e. periods of 1, 7 and 14 days and are listed in the following in Table 2. During the curing period, the samples were stored at 22° C. and 65% relative air humidity. If water was added, then this sample, as given by Table 2, could be undertaken before the pressing process (called "untreated samples") or after pressing process (called "post-treated samples"). The addition totalled around 2 wt % $H_2O$. The samples post-treated with water were investigated once in a dry state.

TABLE 2

| | | \multicolumn{16}{c|}{SOP granulation with sodium salts} |
|---|---|---|---|---|---|---|---|---|---|---|---|---|---|---|---|---|---|

| | | \multicolumn{16}{c|}{Example no.:} |
|---|---|---|---|---|---|---|---|---|---|---|---|---|---|---|---|---|---|
| | | \multicolumn{4}{c|}{1*} | \multicolumn{4}{c|}{2a} | \multicolumn{4}{c|}{2b} | \multicolumn{4}{c|}{2c} |
| Material Additive | | \multicolumn{4}{c|}{SOP fine product 2 +$H_2O$ (reference experiment)} | \multicolumn{4}{c|}{SOP fine product 1 +$H_2O$ + 3.5% NaCl [cyclone dust (evaporated salt)]} | \multicolumn{4}{c|}{SOP fine product 1 +$H_2O$ + 3.5% NaCl [cyclone dust (evaporated salt)} | \multicolumn{4}{c|}{SOP fine product 1 +$H_2O$ + 3.5% NaCl [cyclone dust (evaporated salt)} |
| Curing period (days) | | 0 | 1 | 7 | 14 | 0 | 1 | 7 | 14 | 0 | 1 | 7 | 14 | 0 | 1 | 7 | 14 |
| Untreated samples | | | | | | | | | | | | | | | | | |
| Abrasion [%] | | 27 | 27 | 26 | 23 | 4 | 5 | 6 | 5 | 7 | 2.1 | 5 | 3.7 | 0.1 | 3.0 | 3.6 | 6 |
| Crack strength [N] | | — | 38 | 38 | 37 | — | 47 | 45 | 47 | — | 46 | 51 | 46 | — | 45 | 46 | 50 |
| Post-treated with 2% $H_2O$ | | | | | | | | | | | | | | | | | |
| Not dried | Abrasion[%] | | 1.3 | 7 | 8 | | 0.5 | 3.0 | 1.0 | | 0.2 | 2.8 | 2.9 | | 1.8 | 2.9 | 5 |
| | Crack strength [N] | | 38 | 43 | 46 | | 52 | 50 | 54 | | 42 | 56 | 50 | | 42 | 51 | 56 |

| | | \multicolumn{16}{c|}{Example no.:} |
|---|---|---|---|---|---|---|---|---|---|---|---|---|---|---|---|---|---|
| | | \multicolumn{4}{c|}{3} | \multicolumn{4}{c|}{4} | \multicolumn{4}{c|}{5} | \multicolumn{4}{c|}{6} |
| Material Additive | | \multicolumn{4}{c|}{SOP fine product 1 +$H_2O$ + 1.8% NaCl dust} | \multicolumn{4}{c|}{SOP fine product 1 +$H_2O$ + 3.5% NaCl dust} | \multicolumn{4}{c|}{SOP fine product 2 +$H_2O$ + 1.25% NaCl dust} | \multicolumn{4}{c|}{SOP fine product 2 +$H_2O$ + 1.75% NaCl dust} |
| Curing period (days) | | 0 | 1 | 7 | 14 | 0 | 1 | 7 | 14 | 0 | 1 | 7 | 14 | 0 | 1 | 7 | 14 |
| Untreated samples | | | | | | | | | | | | | | | | | |
| Abrasion [%] | | 7 | 9 | 10 | 11 | 5 | 3.4 | 7 | 7 | 14 | 8 | 13 | 12 | 5 | 4 | 5 | 7 |
| Crack strength [N] | | — | 43 | 46 | 45 | — | 47 | 45 | 46 | — | 36 | 40 | 39 | — | 38 | 44 | 47 |
| Post-treated with 2% $H_2O$ | | | | | | | | | | | | | | | | | |
| Not dried | Abrasion [%] | | | | | | | | | | | | | | 1.6 | 2.6 | 4 |
| | Crack strength [N] | | | | | | | | | | | | | | 34 | 54 | 53 |

TABLE 2-continued

| | | Example no.: | | | | | | | | | | |
|---|---|---|---|---|---|---|---|---|---|---|---|---|
| | | 7 | | | | 8 | | | | 9 | | |
| Material | | SOP fine product 2 | | | | SOP fine product 2 | | | | SOP fine product 2 | | |
| Additive | | +H$_2$O + 2.5% NaCl dust | | | | +H$_2$O + 15% NaCl solution + 1.7% NaCl dust**** | | | | +H$_2$O + 1% Na$_2$SO$_4$** | | |
| Curing period (days) | | 0 | 1 | 7 | 14 | 0 | 1 | 7 | 14 | 0 | 1 | 7 | 14 |
| Untreated samples | | | | | | | | | | | | | |
| Abrasion [%] | | 4 | 3.2 | 7 | 5 | 3.1 | 2.9 | 6 | 7 | 10 | 9 | 7 | 15 |
| Crack strength [N] | | — | 37 | 42 | 45 | — | 42 | 45 | 47 | — | 36 | 44 | 42 |
| Post-treated with 2% H$_2$O | | | | | | | | | | | | | |
| Not dried | Abrasion [%] | | 1.6 | 3.0 | 2.8 | | 0.6 | 2.5 | 2.2 | | 4 | 6 | 7 |
| | Crack strength [N] | | 34 | 49 | 49 | | 35 | 53 | 51 | | 36 | 46 | 46 |

*Reference experiment 1 was also performed with SOP fine product 1 and led to comparable values for abrasion and crack strength as the reference experiment with SOP fine product 2.
Abrasion values <4 are stated to one decimal place
**Target value: 0.3% Na$^+$-content in product; K$_2$O-content >50%;
***Potassium sulphate with <50% K$_2$O can still be used. In principle and within certain bounds, a glaserite formation may also occur during granulation of langbeinite, leading therefore to an improvement in quality.
****With respect to SOP Example 1 (Reference Experiment 1)

Example 1 is a reference experiment for the production of potassium sulphate granulate, so-called SOP granulates, whereby SOP-5 fine product 2 was used as the potassium sulphate powder and no additional sodium salt was added.

The potassium sulphate was preheated in a rotary pipe oven before the pressing process to a temperature of 80° C. For the addition of water before the pressing process, two mass percent with respect to the SOP mass used was added. In another version of the experiment, the samples were post-treated with 2% water after classification and investigated whilst in a non-dry state.

Examples 2a to 2c

In Examples 2a to 2c SOP fine product 1 is used in the production of potassium sulphate granulate and sodium chloride was added as sodium salt in the form of a dust from a crystallisation unit (cyclone dust) with the concentrations (3.5 wt %) given in Table 1. In comparison to Example 1, higher crack strength and improved abrasion values were achieved in Examples 2a to 2c (see untreated samples as well as post-treated samples with 2 wt % water 114 day curing period).

Examples 3 to 4

In Examples 3 to 4, SOP fine product 1 was used during production of potassium sulphate granulate and various doses of sodium chloride were added as sodium salt in the form of a dust from a rock salt such as those given in Table 2. With the addition of NaCl and water, higher crack strength and improved abrasion values were achieved.

Examples 5 to 7

In Examples 5 to 7, SOP fine product 2 was used during production of potassium sulphate granulate and various doses of sodium chloride were added as sodium salt in the form of a dust from a rock salt such as those given in Table 2. The results of Examples 3 and 4 were confirmed. With increasing NaCl dust quantity (0 days and also 14 days curing time) significantly better abrasion values were achieved.

Example 8

Analogously to Examples 5 to 7, NaCl was added in Example 8 in the form of a solution. In this series (5 to 8) it was shown that the addition of NaCl in the form of a solution before compaction allowed high granulate strength to be achieved. In a direct comparison of all samples with sodium chloride as sodium salt in the form of a dust from a rock salt, the best instantaneous abrasion values (0 days=3.1%) were achieved in Example 8. The abrasion and crack strength values were also very good after 14 days curing both without and with post-treatment.

Example 9

In Example 9, SOP fine product 2 was used during production of potassium sulphate granulate and sodium chloride was added as sodium salt in the form of a dust such as those given in Table 2. With the use of sodium sulphate, only the abrasion value of untreated granulate came in under the level of the reference experiment (i.e. is improved), the other values lay in the range of or exceeded the value of Comparison Example 1.

In summary, the data in Table 2 shows that the potassium sulphate granulate produced in the process of the invention with the addition of a sodium salt demonstrates significant improvements compared with the reference experiment as Example 1 with respect to both breaking strength and abrasion. The manufactured potassium sulphate granulates are therefore overall significantly more stable and demonstrate high mechanical stability and reduced dust formation, e.g. during transportation.

Large-scale implementation using a pressure roller with 1000 mm operational width and a diameter of 1050 mm confirmed these good results. In this case, an Na-content of 0.5 wt % to max. 1.4 wt %, preferentially under 1 wt % in the product achieved very good crack strength (approx. 55 N). With regard to abrasion, the values of the raw granulate were about 50% less than the comparison values (abrasion reduced from 30% to 15%), despite the fact that only solid sodium chloride salt was used here. Dust levels were reduced during transport such that no or less dust binding agent had to be used.

Additional experiments were performed for pressure agglomeration using a model L200/50 laboratory press from the Bepex company. Here too the good results, e.g. with sodium chloride or thenardite ($Na_2SO_4$) were confirmed.

The invention claimed is:

1. A process for producing potassium sulphate granulates, comprising:
    adding a sodium salt to the potassium sulphate during granulation,
    wherein said sodium salt is selected from the group consisting of sodium chloride, sodium sulphate, sodium sulphate hydrate, sodium hydroxide and mixtures thereof,
    wherein said sodium salt is added in a quantity of 1.8 to 4.0 wt %, with respect to the used potassium sulphate,
    wherein during said granulation, compaction is performed as pressure agglomeration.

2. The process according to claim 1, wherein the sodium salt is added in the form of a dust with a maximum particle size of 200 μm or in the form of an aqueous solution.

3. The process according to claim 1, wherein a fraction of the sodium salt is added in the form of a dust with a maximum particle size of 200 μm with the rest in the form of an aqueous solution.

4. The process according to claim 1, wherein the sodium salt is in the form of a dust having a bulk density of between 250 kg/m$^3$ to 1300 kg/m$^3$.

5. The process according to claim 1, wherein the sodium salt is sodium chloride.

6. The process according to claim 1, wherein a quantity of water added before or during a pressing process is in the range of 0.1 wt % to 2.5 wt %, and/or after the pressing process in the range of 0.1 wt % to 2.5 wt %, and the total quantity of added water is maximal 3.5 wt % with respect to anhydrous potassium sulphate.

7. The process according to claim 1, wherein pressure agglomeration comprises the compaction of the mixture consisting of potassium sulphate, sodium salt and water using a roller press.

8. The process according to claim 7, wherein pressure agglomeration comprises the compaction of the mixture consisting of potassium sulphate, sodium salt and water using a roller press under a specific line load of between 30 kN/cm to 100 kN/cm, and a 1000 mm roller diameter and an average slug thickness of 10 mm.

9. The process according to claim 7, wherein compaction of the mixture of potassium sulphate, sodium salt and water is performed with a roller press and subsequent grinding and classification of slugs obtained by compaction.

10. The process according to claim 9, wherein the slugs are moistened with water after the pressing process.

11. The process according to claim 1, wherein the granulation is performed at a temperature of between 20° C. to 100° C.

12. The process according to claim 1, comprising adding sodium to the potassium sulphate in a granulation process in a quantity of 2.5 to 3.5% by weight, based on the potassium sulphate used.

13. The process according to claim 1, wherein
    at least 90% by weight of the potassium sulphate used for the granulation consists of particles having a particle size ranging between 0.01 and 2.0 mm, where a $d_{50}$ value of the potassium sulphate particles ranges between 0.05 and 1.1 mm, and
    at least 90% by weight of the sodium salt, which is in the form of a dust, has a particle size ranging between 0.01 and 0.2 mm, where a $d_{50}$ value of the sodium salt particles is between 0.01 and 0.2 mm.

14. The process according to claim 1, wherein
    at least 90% by weight of the potassium sulphate used for the granulation consists of particles having a particle size ranging between 0.02 and 1.0 mm, where a $d_{50}$ value of the potassium sulphate particles ranges between 0.1 and 0.7 mm, and
    at least 90% by weight of the sodium salt, which is in the form of a dust, has a particle size ranging between 0.02 and 0.1 mm, where a $d_{50}$ value of the sodium salt particles is between 0.01 and 0.2 mm.

* * * * *